United States Patent

[11] 3,589,495

| [72] | Inventors | Florentin J. Pearne<br>Whittier;<br>Frank S. Pearne, San Gabriel; Frederick G. Robson, Long Beach, all of, Calif. |
|---|---|---|
| [21] | Appl. No. | 850,849 |
| [22] | Filed | Aug. 18, 1969 |
| [45] | Patented | June 29, 1971 |
| [73] | Assignee | Aircraft Mechanics, Inc.<br>Los Angeles, Calif.<br>Continuation-in-part of application Ser. No. 478,913, Aug. 11, 1965, now Patent No. 3,478,397. |

[54] BRICK MAKING MACHINE
21 Claims, 20 Drawing Figs.

[52] U.S. Cl. .................................................. 198/33,
198/35, 214/1, 214/6
[51] Int. Cl. ...................................................... B65g 57/08
[50] Field of Search .......................................... 214/1 R, 1
BS, 6, 6 A, 6 FS, 6 F; 198/35, 33 R

[56] References Cited
UNITED STATES PATENTS

| 2,917,991 | 12/1959 | Segur | 214/6 (F) |
| 2,955,717 | 10/1960 | Segur et al. | 214/6 (F) |
| 3,391,805 | 7/1968 | Baden | 214/6 (FS) |
| 3,448,867 | 6/1969 | Raynor et al. | 214/6(.2) |

FOREIGN PATENTS

| 1,183,020 | 12/1964 | Germany | 214/6 (FS) |

*Primary Examiner*—Gerald M. Forlenza
*Assistant Examiner*—Robert J. Spar
*Attorney*—McNenny, Farrington, Pearne and Gordon ABSTRACT: An automated brick hacker is disclosed which includes an inverter stacker operable to position one elongated cut or uncut slug of unfired brick material on a subsequent cut or uncut slug. In one embodiment, an inverter is pivoted for movement between a position aligned with an off-bearing belt and an inverted position over the belt. A pusher operates to slide alternate slugs from the off-bearing belt onto the inverter. Vacuum means grip the slug while it is inverted and positioned over the subsequent slug on the off-bearing belt. In another embodiment, an inverter stacker is provided which is operable to grip lateral sides of a slug along its length and raise the slug for positioning on a subsequent slug with or without inversion. A pusher drivingly engages the rearward end of a cut slug for movement into the inverter and spaces adjacent slugs without creating spaces between bricks in the slug. A pneumatic gripper is provided to gently, but securely, grip a plurality of bricks for transfer from one location to another.

INVENTORS
FLORENTIN J. PEARNE,
FRANK S. PEARNE,
FREDERICK G. ROBSON
BY McNENNY, FARRINGTON, PEARNE & GORDON
ATTORNEYS

INVENTORS
FLORENTIN J. PEARNE,
FRANK S. PEARNE,
BY & FREDERICK G. ROBSON
McNENNY, FARRINGTON, PEARNE & GORDON

ATTORNEYS

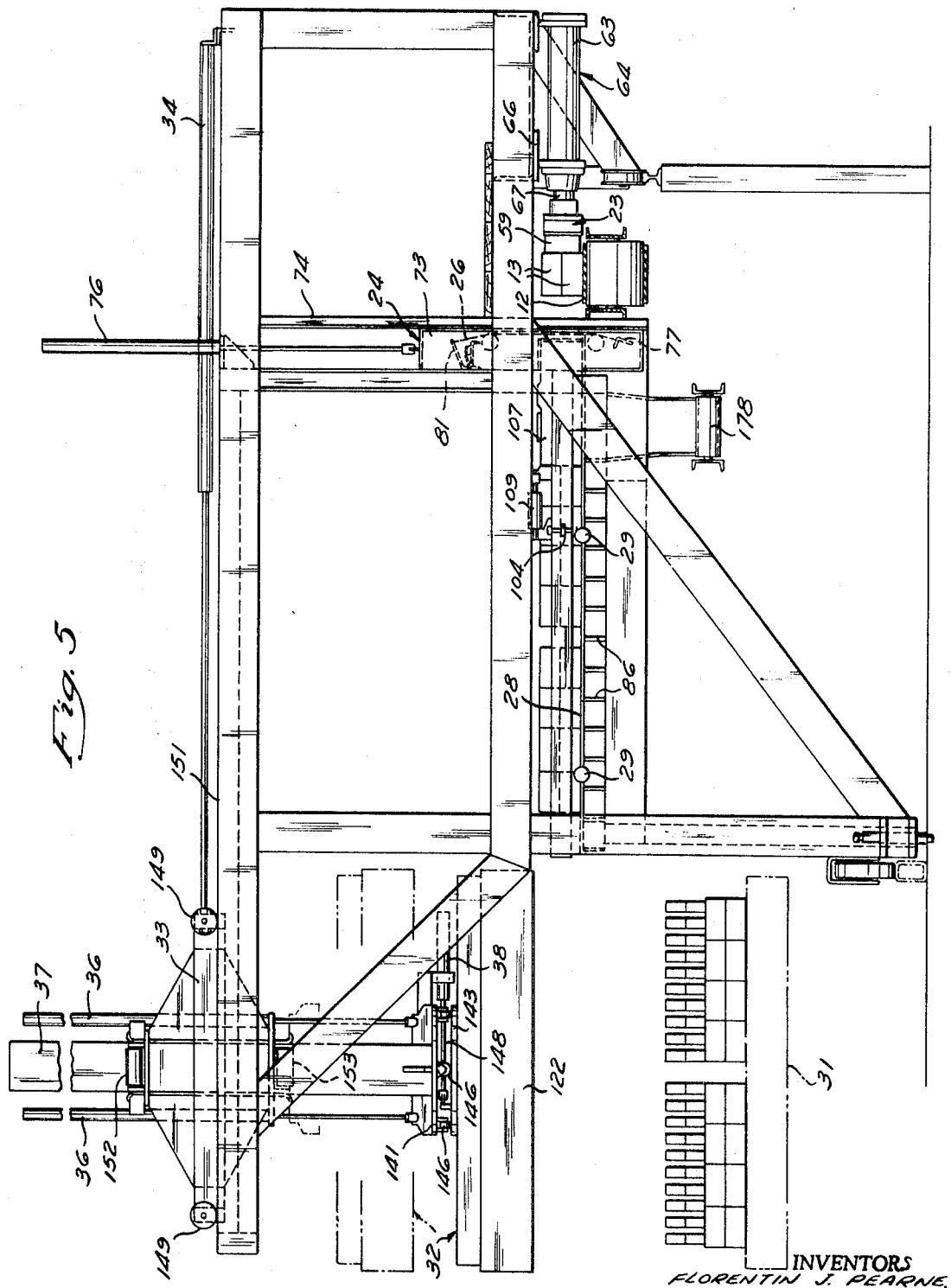

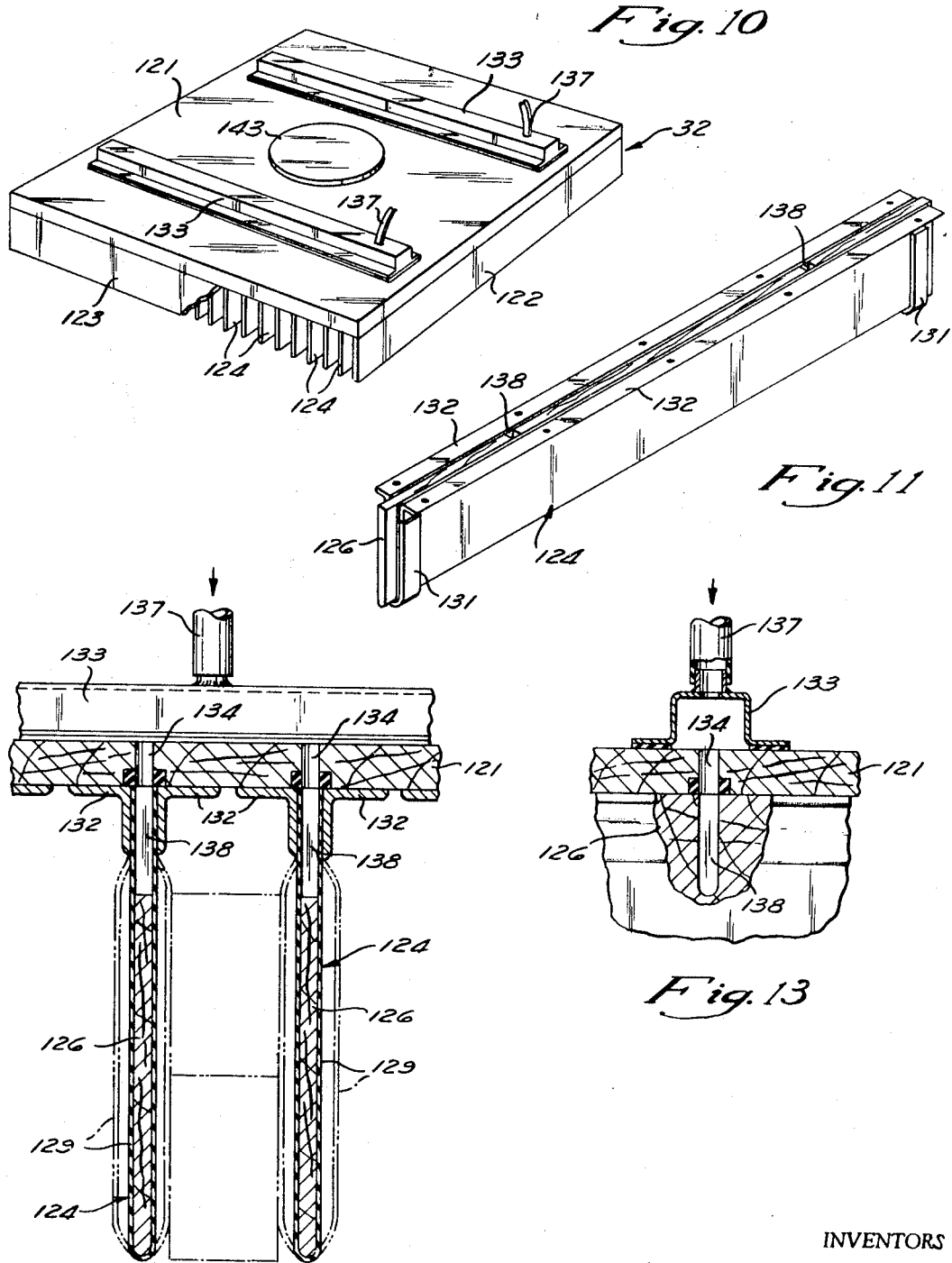

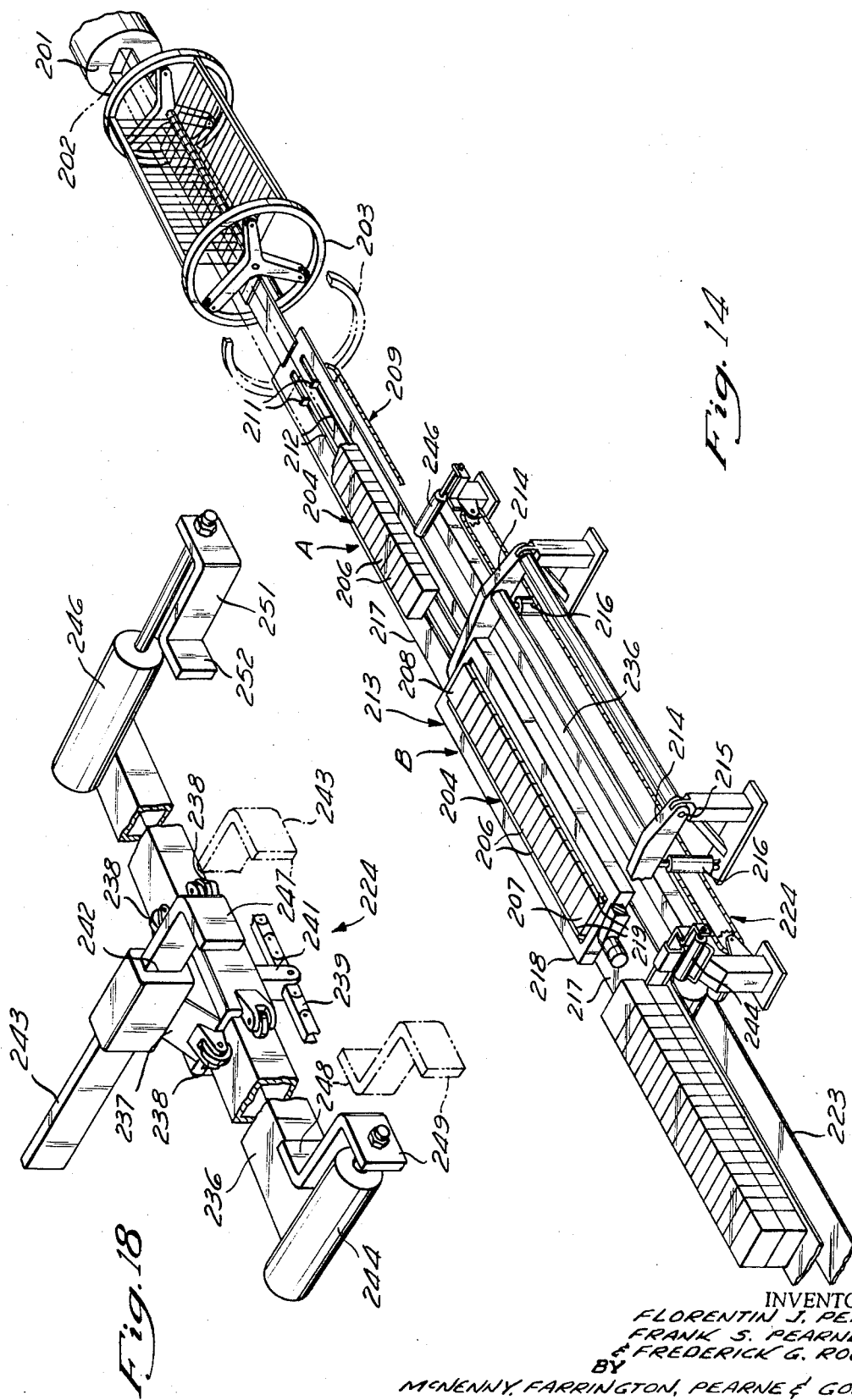

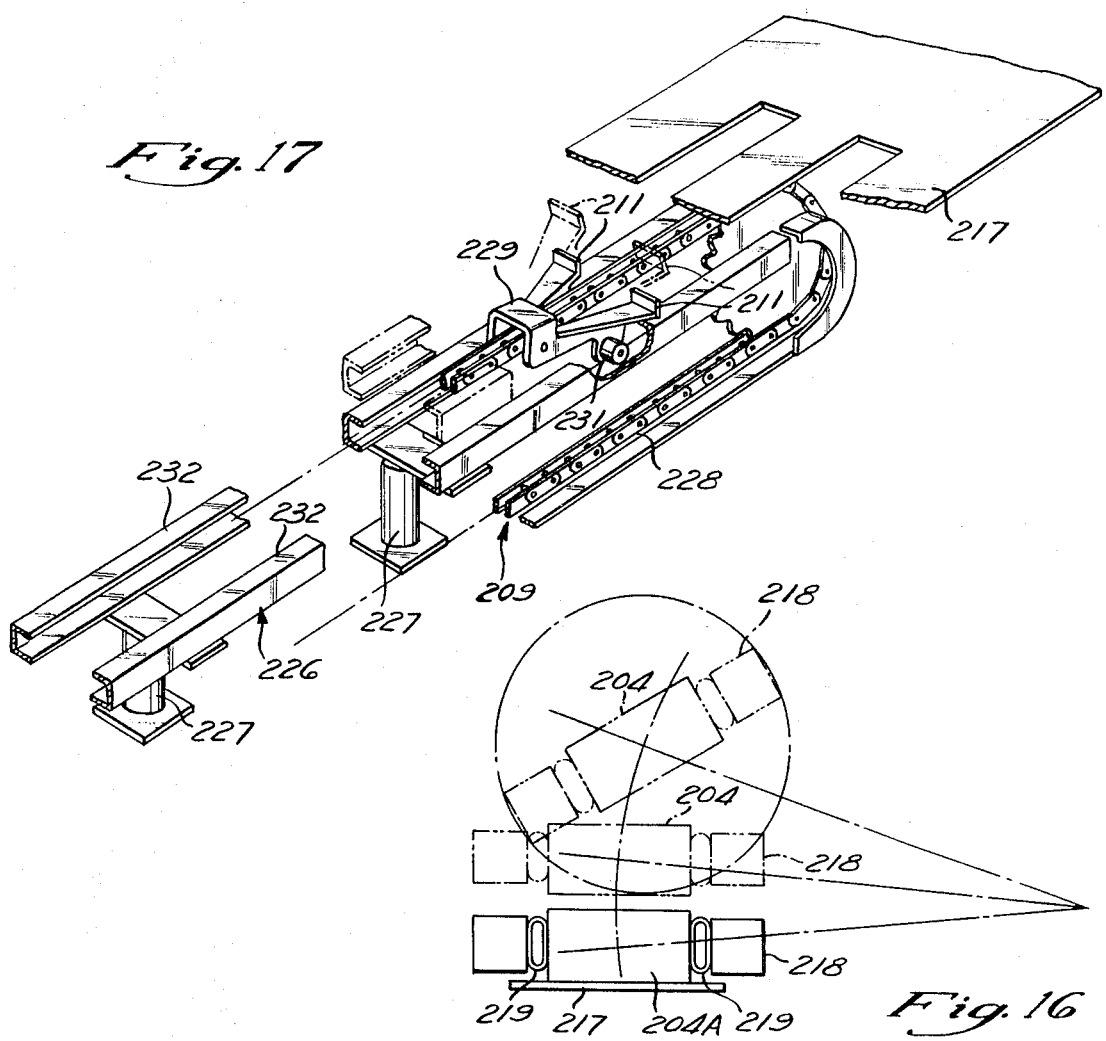
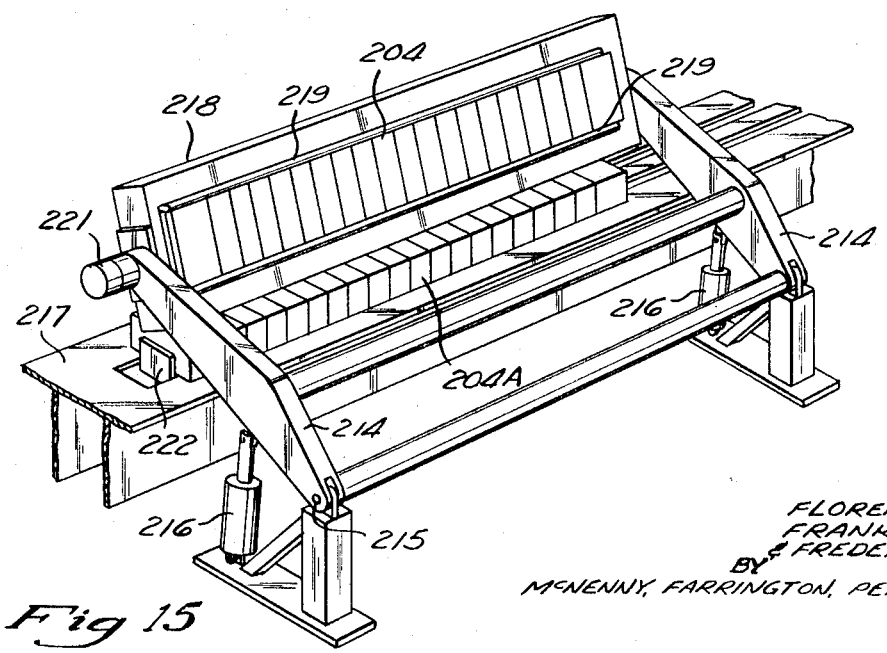

BRICK MAKING MACHINE

This application is a continuation-in-part of our copending application, Ser. No. 478,913, filed Aug. 11, 1965 now Pat. No. 3,478,397.

BACKGROUND OF INVENTION

This invention relates generally to the manufacture of bricks or the like and more particularly, to a machine for automatically forming and handling brick.

PRIOR ART

In the past various types of machines have been proposed for the automated manufacture of bricks or the like. One such machine is illustrated in the U.S. Pat. No. 2,710,696 to Fontaine et al.

SUMMARY OF INVENTION

In a machine incorporating the present invention, most of the operations are performed on bricks arranged in pairs with one brick of each pair resting on the other brick. These pairs of brick are processed in rows of pairs so that the various operations can be simultaneously performed on a relatively large number of brick. With such an arrangement, high production capacity can be achieved without requiring the machine to operate at a high cyclic rate.

In one illustrated machine system, the brick material is continuously extruded to form a column having the required brick cross section. The column is cut into slugs or predetermined length which are carried by an off-bearing belt to a cutter station. This illustrated machine has the capacity for handling slugs long enough to form rows containing 22 individual bricks. However, the machine can handle, with equal facility, slugs of shorter length.

Between the slug cutter and the cutting and hacking station is an inverter which automatically inverts one slug and positions it on top of a subsequent slug moving along the off-bearing belt. All subsequent operations are performed simultaneously on two vertically stacked slugs. In the machine of the first embodiment, the two slugs are pushed through a cutter frame to cut the slugs into individual bricks arranged in superposed pairs. The rows of superposed pairs of brick are then moved to a spreader table where the rows are grouped and spread to provide spaces between laterally adjacent pairs of brick. A transfer then operates to grip the bricks resting on the spreader table and to transfer and deposit the bricks on a kiln car or the like in a predetermined pattern.

In a second embodiment of this invention, the column of brick material is extruded directly into a cutter which cuts the column into the individual bricks. The cutter operates to simultaneously cut a predetermined number of bricks from the column to form a group of bricks or cut slug positioned in abutting relationship. The group of bricks is then moved to an inverter stacker which operates to grip an entire group of bricks and to automatically position such group on a subsequent group in a manner so that pairs of superposed bricks are provided. The inverter stacker is arranged so that it can position one group of bricks on top of a subsequent group of bricks with or without inverting the gripped bricks. The superposed rows of bricks are then moved to the subsequent operating stations where the groups of bricks may be positioned on a spreader table and subsequently transferred to a kiln car or the like. The inverter stacker, in accordance with the second embodiment of this invention may also be used to position uncut slug on top of another slug with or without inversion of the slug. In such a system, the superposed slugs are then cut into the individual bricks in a manner as illustrated in conjunction with the first embodiment.

The present invention is directed to a novel and improved brick handling machine including an inverter stacker operable to position a slug or a group of cut bricks in superposed position on a subsequent slug or group of bricks. In accordance with a first embodiment of this invention, the inverter stacker is provided with an inverter plate pivotal between a position horizontally aligned with the conveyor belt and an inverted position over the conveyor belt. Means are provided to push a slug from the conveyor belt onto the inverter plate for inverting and stacking on a subsequent slug moving along the conveyor belt. Vacuum gripping means are provided on the inverter plate to grip the slug so that it is held tightly against the inverter plate as the plate turns to the inverted position. The various elements are proportioned so that the gripped slug is positioned immediately above the subsequent slug and the vacuum is released to drop the gripped slug onto the subsequent slug.

In a second embodiment, an inverter stacker is provided which can be used to stack one slug or group of bricks on another slug or group of bricks with or without inversion of such slug or group of bricks. In this embodiment, a first slug or a first group of bricks is gripped by inflatable grippers and raised to a position above the inverter table or conveyor. In this embodiment means are provided to insure proper vertical alignment of the pairs of brick or slugs. If inversion is required, the gripper frame is turned through 180° to invert the gripped slug or group of bricks. When a subsequent slug or group of bricks is positioned at the inverter station, the gripper frame is lowered to position the gripped slug or group of bricks on the subsequent slug or group of bricks. The gripper frame is arranged to provide individual gripping of each brick in the group when the inverter stacker is used in conjunction with cut brick. The same gripper frame operates to grip a slug along its entire length when the inverter stacker is used in conjunction with uncut slugs.

BRIEF DESCRIPTION OF DRAWINGS

FIG. 5 is a side elevation of the section of the machine illustrated in FIG. 4;

FIG. 10 is a fragmentary perspective view of the gripper frame with parts broken away;

FIG. 11 is a perspective view of a single gripper assembly;

FIG. 12 is a fragmentary end view illustrating the gripper operation;

FIG. 13 is a fragmentary section of the gripper manifold and connecting passageways;

FIG. 14 is a schematic perspective view of a second embodiment of this invention providing an inverter stacker which is operable to stack a slug or a group of cut bricks on a subsequent slug or group of cut bricks with or without inversion;

FIG. 15 is an enlarged perspective view of the inverter stacker illustrated in FIG. 14;

FIG. 16 is a schematic view illustrating the inverter operation;

FIG. 17 is an enlarged fragmentary perspective view illustrating the drive mechanism for moving a group or bricks into the inverter position; and FIG. 18 is a schematic perspective view of the drive mechanism for moving the stacked brick out of the inverter position.

Referring to FIG. 1, the clay mix is extruded from a die 10 as a column 11 with the proper cross section to form the bricks. The column 11 extruding from the die 10 extends along an off-bearing conveyor belt 12 under a bow cutter 9. The bow cutter automatically operates when a predetermined length has passed therethrough to cut a slug 13 from the column 11 having a length which can be subsequently cut to produce a row containing the desired number of bricks. The off-bearing belt 12 moves faster than the rate of extrusion, so a spacing is produced between the slugs 13 carried along the belt.

Figure 1:
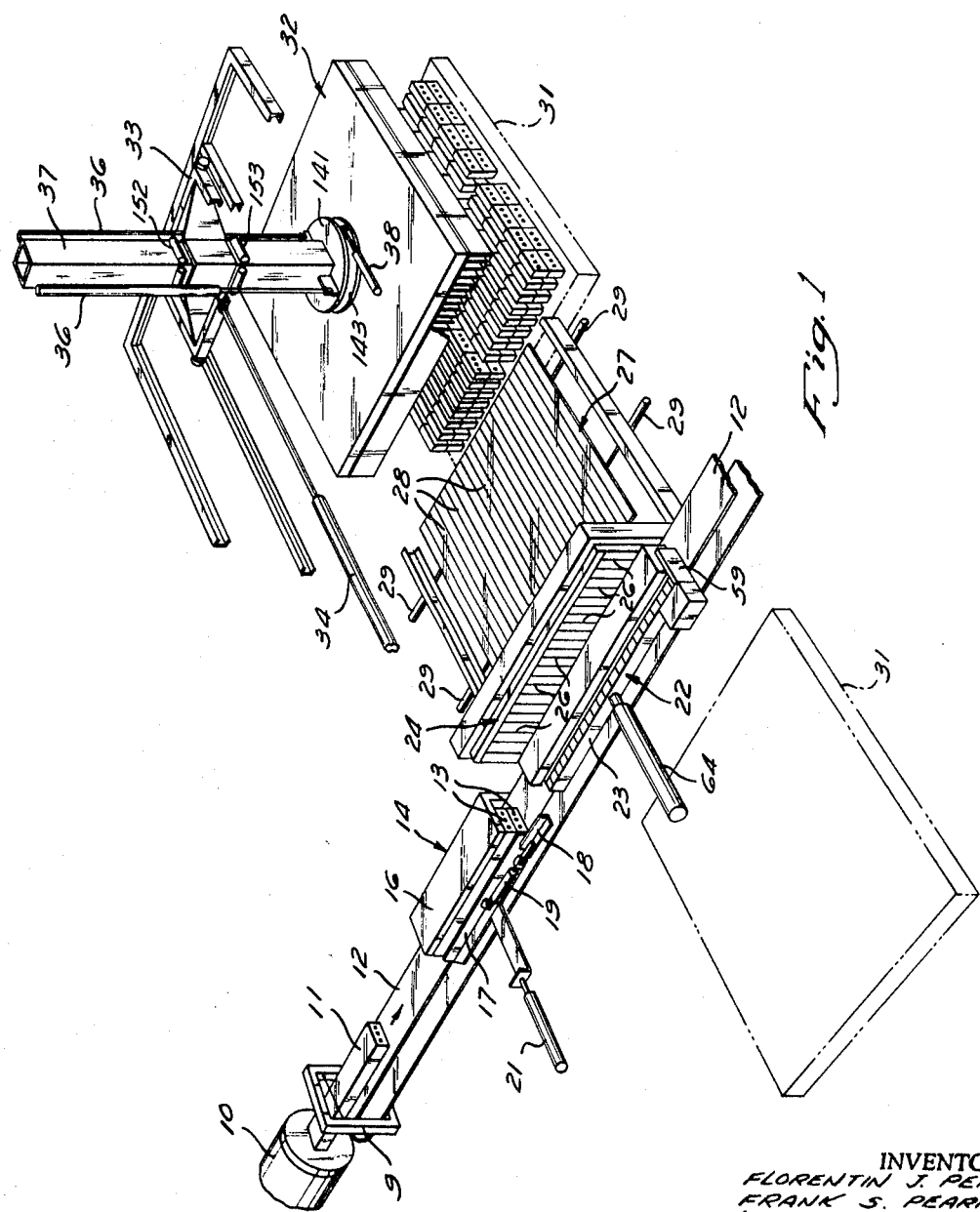
FIG. 1 is a schematic perspective view of the entire brick hacking machine incorporating this invention illustrating the general physical arrangement of the various elements and subassemblies thereof.

An inverter station is located adjacent to the belt 12 and includes an inverter plate 16 and pusher 17. A retractable gate 18 operated by an actuator 19 is pivoted on the pusher 17 and is movable from a retracted position (illustrated in FIG. 1) to an extended position in which it engages the end of the slugs carried along the belt 12. A second actuator 21 is connected to the pusher 17 and is operable to move the pusher across the belt to slide a slug 13 onto the inverter plate 16 when the inverter plate is in a position horizontally aligned with the belt.

The inverter station mechanism operates to invert alternate slugs and position such inverted slug on the subsequent slug moving along the belt 12 to form a pair of slugs in vertical alignment. The details of the structure and the mode of operation of the inverter will be described in detail below.

When the two slugs are positioned one above the other, the gate 18 is retracted and the two slugs are carried along by the belt 12 to a cutter station 22. Located at the cutter station is a pusher 23 and a cutter frame 24 positioned on opposite sides of the belt 12. The cutter frame 24 is provided with a plurality of vertically extending parallel cutter wires 26 which are spaced apart a distance equal to the height of the required bricks and which operate to cut the two slugs 13 into rows of individual bricks when the slugs are pressed through the frame 24 by the pusher 23. Here again, the structural detail of the cutter frame 24 and the pusher 23 is discussed in detail below.

After the two slugs 13 are pressed through the cutter frame 24, the individual bricks are in rows of aligned and abutting bricks with one row resting on the other. From the cutter frame 24 the rows of bricks are pulled onto a spreader table 27 having a plurality of parallel and laterally movable spreader bars 28. The spreader bars 28 are movable from a closed position in which they abut each other (as illustrated in FIG. 1) to an open position in which each of the bars is laterally spaced from the adjacent bars. Actuators 29 are connected to close and spread the spreader bars 28 of the spreader table 27. When the spreader table is in the closed position of FIG. 1 each of the bars 28 is aligned with one of the spaces between the cutter wires 26, so when the rows of cut brick are moved onto the spreader table each pair of vertically aligned bricks of the rows is located on one of the spreader bars 28. Since the wires are very thin, the bricks in the rows are substantially in abutting relationship at this time.

After the required number of rows are positioned on the spreader table, the actuators 29 are operated to separate the spreader bars and the rows of brick supported thereby to provide a lateral spacing between each pair of vertically stacked bricks. This spacing is required for two purposes. The first is to permit a gripper transfer to project in between the adjacent pairs of bricks and individually grip the bricks for transfer to a kiln car 31 and also to provide spaces between adjacent bricks so that the subsequent firing of the brick will produce uniform heating.

When the desired number of rows of bricks are located on the spreader table and the spreader table has been spread, a gripper transfer 32 moves down over the bricks and individually grips each brick for transfer to the kiln car 31. The gripper transfer 32, supported on a carriage 33, is reciprocable from a position over the spreader table to a position over a kiln car 31 located at the loading position. An actuator 34 provides the power for this reciprocation. The gripper transfer 32 is also vertically movable with respect to the carriage 33 by a pair of actuators 36 which lift or lower a support column 37 which is guided for vertical movement with respect to the carriage 33. The gripper transfer 32 is also rotatable about a vertical axis from the position illustrated through 90° by an actuator 38. Here again, the structural detail of the gripper transfer and its supporting structure is discussed in detail below. However, the gripper transfer 32 operates to individually grip all of the bricks located on the spreader table and transports such bricks to the kiln car 31 where they are deposited.

The first group of bricks are normally deposited in alignment with the length of the car and the next group also consisting of pairs of vertically aligned bricks are deposited at right angles on the first group. This continues with each group perpendicular to the preceding group until the stack of bricks located on the kiln car 31 reaches the desired height.

When a given kiln car 31 is completely loaded with bricks, means (not illustrated) automatically move the loaded kiln car to the kiln where the bricks are fired and also move an empty car into position for loading.

Figure 2:
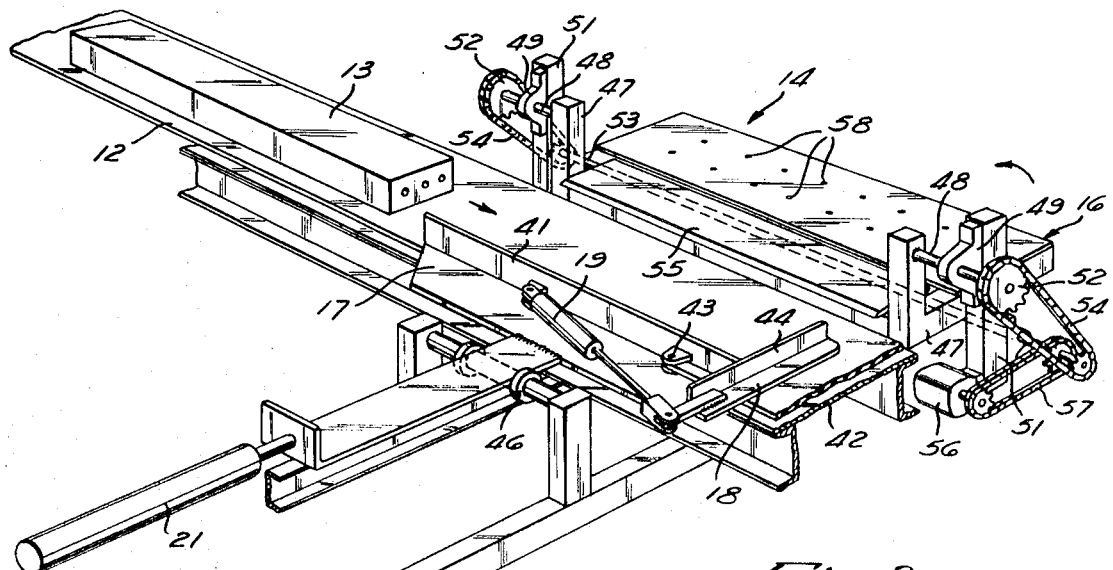
FIG. 2 is a fragmentary perspective view of the inverter which operates to invert alternate slugs carried along the off-bearing belt and position such inverted slug on top of the subsequent slug.

The structure at the inverter station 14 is best illustrated in FIG. 2. When the pusher 17 is in the retracted position, a vertical flange 41 is positioned adjacent to the off-bearing belt 12. A support plate 42 under the belt 12 insures that the vertical position of the belt 12 is properly maintained. The gate 18 is rotated about its pivot 43 by the actuator 19 to the extended position illustrated. The gate 18 is provided with a vertical flange 44 positioned at right angles to the flange 41 and across the belt 12 when the gate is in the extended position. The entire pusher is supported on bearings 46 for movement perpendicular to the line of movement of the off-bearing belt 12.

The inverter plate 16 is mounted on L-shaped end supports 47 which are mounted on shafts 48 journaled in bearings 49 on the machine frame elements 51. Each of the shafts 48 is provided with a sprocket wheel 52 connected to a countershaft 53 by a chain drive 54. The countershaft 53 is, in turn, driven by a motor 56 through a chain drive 57.

Operation of the motor 56 causes the inverter plate 16 to move from a first position (illustrated in FIG. 2) in which the upper surface thereof is horizontally aligned with the surface of the belt 12 and a second or inverted position in which the inverter plate 16 rotates about the pivots of the bearings 49 through 180° and is positioned above the belt 12. The offset of the supports 47 are proportioned so that the surface of the inverter plate 16 is spaced above the belt 12 by a distance slightly more than twice the height of the slugs 13 when the inverter plate is in the inverted position.

The inverter plate is provided with a plurality of perforations 58 connected to a source of vacuum through a control valve. When a slug is positioned on the plate 16 over the openings 58 vacuum is supplied to the openings and the slug is gripped.

The operation of the inverter is as follows. THe gate 18 is extended to a position across the off-bearing belt 12 as a slug 13 is carried by the belt into the inverter station. Engagement of the end of the slug 13 with the flange 44 of the gate 18 prevents further movement of the slug with the belt and positions the slug for movement laterally onto the inverter plate 16. The actuator 21 is then operated to extend the pusher 17 to slide the slug across an intermediate bridge element 55 onto the inverter plate 16. The pusher 41 is then retracted before the arrival of the next or subsequent slug 13 and vacuum is applied to the openings 58.

The motor 56 is then energized to rotate the inverter plate 16 through 180° to position the slug supported thereby over the belt 12. As a subsequent slug proceeds along the belt it engages the gate 18 and is held in a position in alignment directly beneath the slug supported by the plate 16. The vacuum is then released and the inverted slug 13 drops onto the subsequent slug 13 forming a stack of two slugs (as best illustrated in FIG. 1). The gate 18 is then retracted by the actuator 19 clear of the two slugs 13 and the pair of slugs are carried along with the belt 12 to the cutter station 22.

Figure 3A:
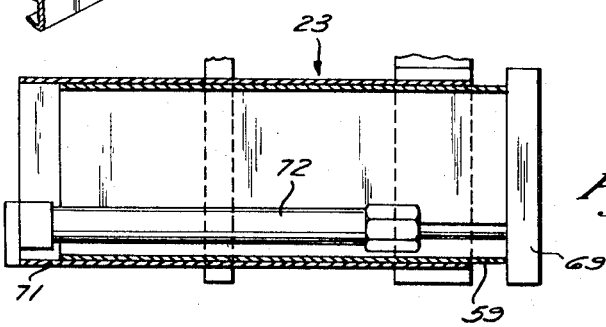
FIG. 3a is an enlarged fragmentary section taken along 3a—3a in FIG. 3.
Figure 3:
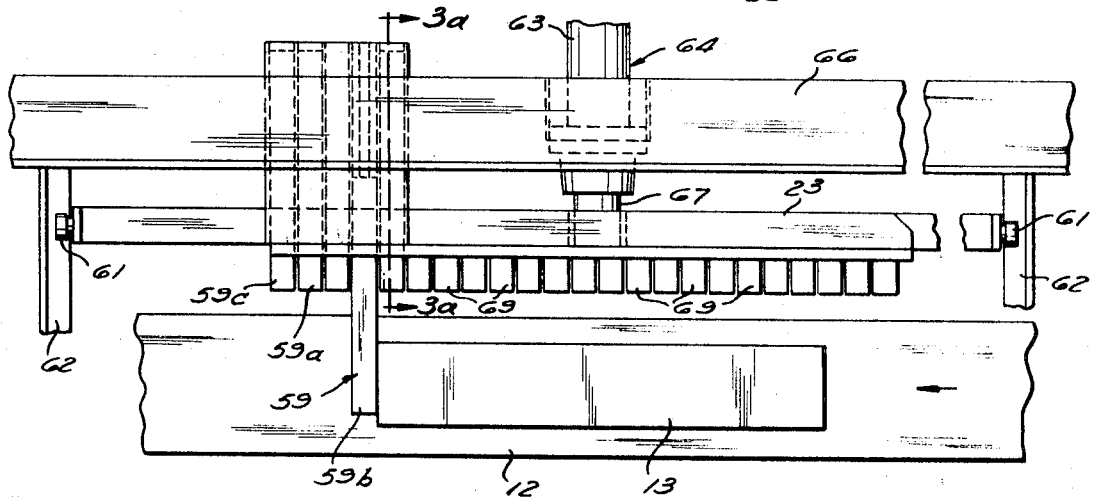
FIG. 3 is a fragmentary plan view of the cutter pusher for positioning slugs carried along the off-bearing belt and pushing such slugs through the cutter frame.
Figure 4:
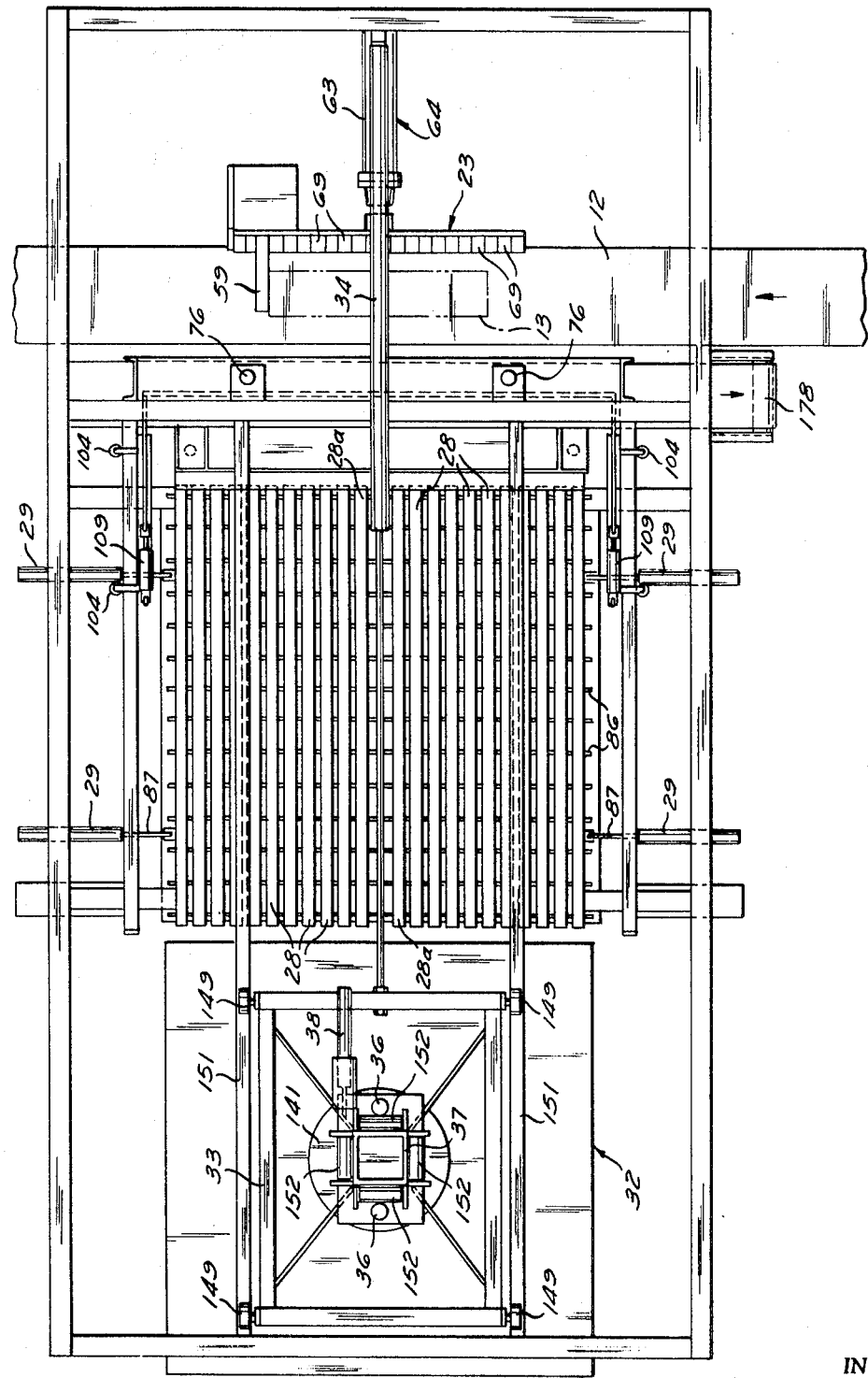
FIG. 4 is a plan view of the cutter station, separator table and gripper transfer with parts removed for purposes of illustration showing the separator table in the separated position.

Reference should now be made to FIGS. 3 through 5 which illustrate the structure of the pusher 23. As the two slugs 13 are carried along the off-bearing belt 12 from the inverter station they reach a position adjacent the pusher 23 with their ends in engagement with a retractable gate 59. The gate 59 prevents further travel of the slugs 13 with the belt 12, and the slugs are in position for movement through the cutter frame 24.

The pusher 23 is supported for movement perpendicular to the belt 12 on rollers 61 which move along frame elements 62. The cylinder 63 of the pusher actuator 64 is mounted on a frame element 66 and is provided with a piston 67 connected to the pusher 23 so that retraction of the piston 67 moves the pusher 23 to the retracted position illustrated, and of the piston 67 moves the pusher 23 perpendicular to the line from movement of the off-bearing belt 12 and carries the slugs 13 through the cutter frame.

Mounted on the pusher 23 are a plurality of pusher blocks 69 which are spaced from each other and arranged so that the spaces are aligned with the cutter wires 26 so that the slug can be pushed completely through the frame to a position wherein the rows of cut bricks are spaced from the wires on the side opposite the pusher 23. The pusher is also provided with a group of retractable gates 59 which can be selectively extended to perform the gating function as the slugs 13 move along the belt or retracted to perform the pusher function. Generally, only one of the retractable gates 59 is extended at a given time. When a slug having a length to form 14 bricks is to be cut the retractable gate at the eighth space from the actuator 63 is extended so that the slug is symmetrically located with respect to the center of the pusher. On the other hand, when the slug is 16 bricks long the retractable stop 59b at the ninth position is extended to symmetrically locate the slug with respect to the pusher. When slugs having a length for 22 bricks are to be cut the last retractable pusher 59c is extended.

Referring to FIG. 3a, the retractable pushers 59 are located in a housing 71 and are guided for longitudinal movement relative thereto. The retractable stops 59 are hollow and open at their rearward end. A retractable stop actuator 72 is mounted within each of the associated retractable stops with its cylinder anchored on the housing 71 and the piston connected to the retractable stop. Therefore, extension of any of the actuators 72 causes movement of the associated retractable stop 59 to the extended position and conversely retraction of the actuators draws the associated retractable stops back to the retracted position.

Figure 7:
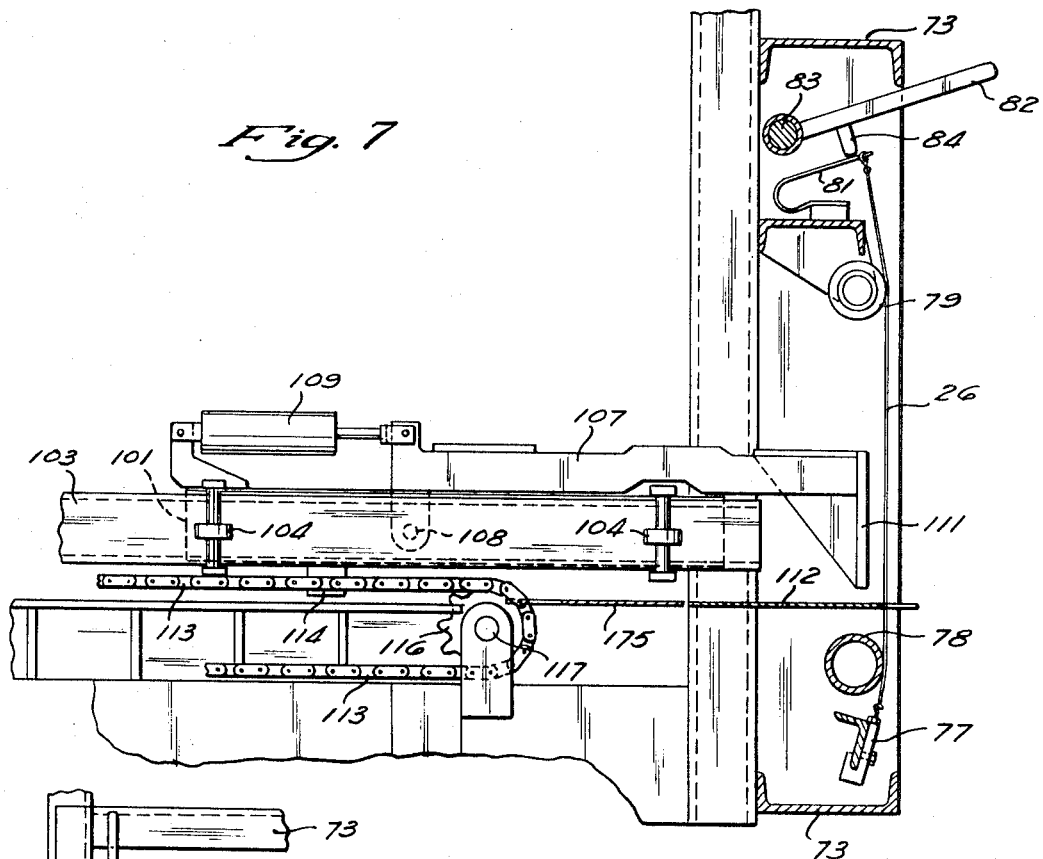
FIG. 7 is a fragmentary side elevation of the cutter frame illustrating the support for the cutter wires and also illustrating the structure of the drag which moves the rows of bricks onto the separator table.
Figure 8:
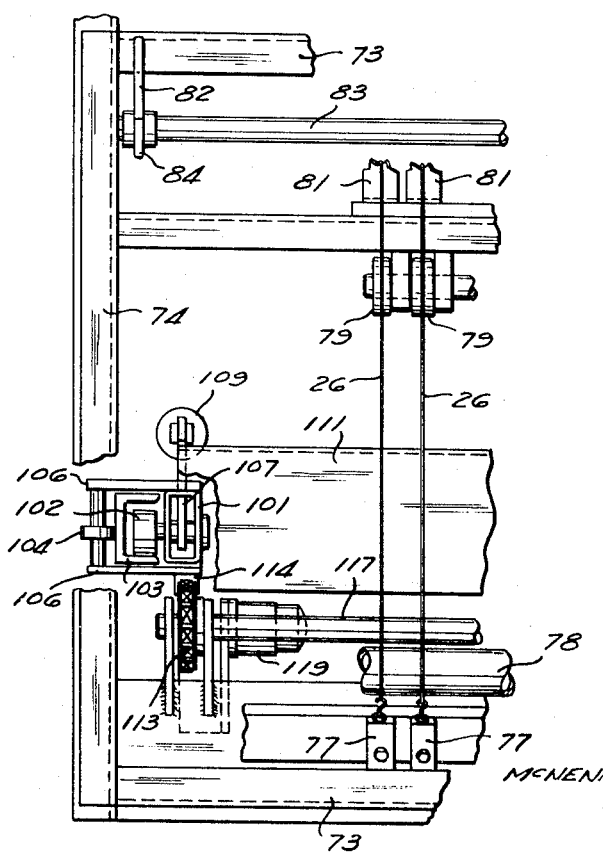
FIG. 8 is a fragmentary end view of the cutter frame and drag illustrated in FIG. 7.

The structure of the cutter frame 24 is best illustrated in FIGS. 5, 7, and 8. The cutter frame includes a rectangular frame 73 vertically slidable in guideways 74 between an operative position (illustrated in FIG. 5) and a raised position in which it can be serviced. A pair of actuators 76 are connected to raise and lower the frame 73.

The cutter wires 26 are fastened at their lower ends to a support 77 and extend up over a fixed bar 78 and a roller 79 to a tensioning spring 81. These springs are proportioned to hold the cutter wires taut but provide give to protect the wires 26 against breakage as the slugs are pressed through the frame and cut by the wires 26. A lever 82 is slidable along a pivot shaft 83 and is provided with a projection 84 engageable with the upper side of the selected spring 81 to permit compression of the springs to release the tension on the wires 26 when one of the wires must be replaced When the wires must be replaced, either because of wear or breakage, the actuators 76 are operated to raise the frame 73 up clear of the remaining mechanism and the lever 82 is moved along the rod 83 until it is positioned over the appropriate spring 81. The lever is then pulled down to release the tension on the wire to permit the installation of a new wire 26. The frame can then be lowered by extending the actuators 76.

Figure 5A:
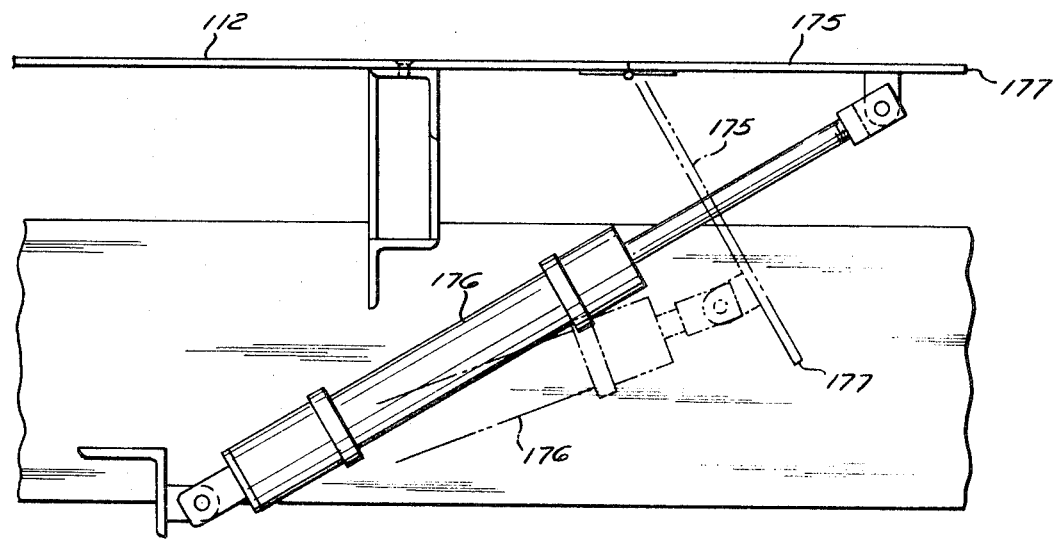
FIG. 5a is an enlarged fragmentary view of the scrap gate.

FIG. 5a illustrates a scrap gate 175 located between the cutter frame 24 and the spreader table 27. There are two similar and opposed gates with one on each side of the machine, but since they are similar in structure only one is illustrated in detail. The scrap gate 175 is extended or lowered to permit handling slugs of different lengths. An actuator 176 is connected to move the scrap gate between the raised position, illustrated in full line, and the lowered position, illustrated in phantom. The slugs 13 are purposely cut slightly long so that the end bricks are properly formed. This produces scrap which falls over the end 177 of the scrap gate 175 onto a scrap conveyor 178 (illustrated in FIG. 5) when longer slugs are provided. When shorter slugs are provided, the gate 175 is lowered and the scrap drops off the end of the plate 112.

Figure 9:
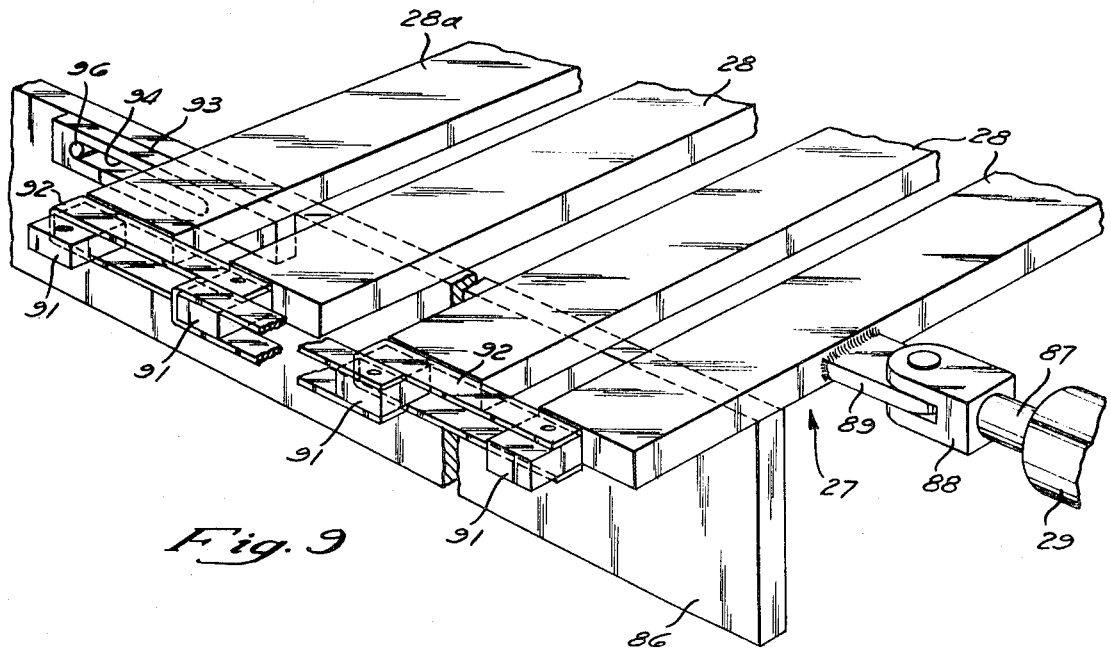
FIG. 9 is an enlarged fragmentary perspective view illustrating the structural detail of the separator table mechanism.

Reference should now be made to FIGS. 4 and 9, which illustrate the structural detail of the separator or spreader table 27. The spreader bars 28 are supported on lateral frame members 86 and are slidable relative thereto between a closed position (as illustrated in FIG. 1) and an opened position (as illustrated in FIG. 4). When the spreader bars 28 are in the closed position of FIG. 1, one bar is aligned with each of the spaces between the cutter wires 26 and the bars are in abutting relationship.

The cylinders of the actuators 29 are mounted on the machine frame and their pistons are connected to the outermost of the spreader bars 28 with one piston mounted near the ends of each of the outermost bars and a total of four actuators provided. The pistons 87 of the actuators 29 are connected to the outermost of the bars 28 by a clevis 88 and bracket 89, as best illustrated in FIG. 9.

Each of the spreader bars 28 is provided with an extension 91 at its end and a U-shaped strap 92 (illustrated in FIG. 9) is mounted on each extension except those of the outermost bars. Each strap extends over the extension 91 of the next inward adjacent spreader bar 28. The extensions 91 have a length twice as long as the width of the U-shaped straps 92 and the straps are staggered, as illustrated.

The various elements are proportioned so that when the spreader bars are pushed to the closed position by extension of the pistons 87, a sequence occurs wherein the outermost spreader bar slides into engagement with the next bar and then carries that bar into engagement with the next bar until all of the bars are adjacent and abutting each other. On spreading, the opposite action occurs and the first part of the retraction of the pistons 87 pulls the outermost bars away from the adjacent bars until the first strap engages the extension of the adjacent bar determining the maximum spacing between the outermost spreader bar 28 and the adjacent spreader bar 28. When this occurs, the two outermost bars move in unison until the next strap picks up the adjacent bar. This continues until all of the spreader bars have been moved to the open position.

The two centermost spreader bars 28a are provided with a slotted member 93 at each end. The member 93 is formed with a slot 94 extending over a pin 96 in the adjacent support 86. When the spreader bars are in the closed position, the pin 96 engages one end of the slot 94 insuring exact positioning of the spreader table bars and when in the open position, the pin 96 engages the other end of the slot 94 cooperating with the strap elements 92 to insure proper positioning of each of the spreader bars in the open position. This simple and very durable structure insures exact positioning of the spreader bars in both the opened and closed position and requires essentially no maintenance.

Referring to FIGS. 7 and 8, a puller is provided to move the rows of cut brick from a position immediately adjacent to the cutter frame to the proper position on the spreader table. A puller carriage 101 is provided with rollers 102 which move along opposed channel frame members 103 forming part of the machine frame. There are two similar but opposite puller carriages, one on each end of the puller. Outboard rollers 104 are supported by strap members 106 and engage the outside of the channels 103. The rollers 102 and the outboard rollers 104 cooperate to guide the two puller carriages 101 for longitudinal movement between a position adjacent the cutter frame and a position back along the spreader table. An arm 107 is pivoted on each puller carriage by a pivot pin 108 and is movable by an actuator 109 between the lowered position of FIG. 7 and a raised position. A drag or puller plate 111 is supported on its ends by the arms 107 and is proportioned to fit behind the row of cut bricks adjacent the cutter wires 26 when the arms 107 are in the lowered position. Retraction of the actuator 109 operates to rotate the arms 107 in an anticlockwise direction (as viewed in FIG. 7) and lift the plate 111 above the bricks on the plate 112 between the wires 26 and the spreader table 27.

In order to move the plate 111 along the spreader table a chain drive is provided. The ends of a chain 113 are connected to a projection 114 on the puller carriage 101 and pass over spaced sprocket wheels 116. A sprocket wheel 116 is provided on each end of a shaft 117 substantially adjacent to the cutter frame and similar sprocket wheels are provided on opposite ends of another shaft located adjacent to the opposite end of the spreader table 27. A suitable motor 119 is connected to rotate the shaft 117 and through the connection of the chains 113 moves the puller carriage axially along the channels 103. Thus, the puller plate 111 can be reciprocated backward and forward along the machine by the motor 119 and raised and lowered by the actuators 109.

Referring now to FIGS. 10 through 12, the gripper transfer 32 is provided with a rectangular support member 121 closed on its side edges by sideplates 122. A plurality of gripper assemblies 124 extend lengthwise between the end plates 123 and parallel to the sides 122. The spacing between the gripper assemblies 124 is proportioned so that when the gripper transfer is lowered over the spreader table 27, after the spreader table has been opened, the gripper assemblies 124 are aligned with the spaces between the spreader bars with one gripper assembly 124 on each side of the bricks supported on the spreader table.

Each of the gripper assemblies includes a support member 126, preferably formed of plywood or the like, which extends into grooves in the end plates 123 and is secured therein by a suitable glue. Wrapped around each of the plywood stiffeners is a flexible and elastic sheet 129 preferably formed of rubber or rubberlike material. The ends of the sheets adjacent to the sideplate 123 are clamped into sealing engagement with the plywood sheet by clamp members 131. Angle iron clamp members 132 press the edges of the sheet 129 adjacent to the support plate 121 into sealing engagement with opposite sides of the plywood sheet 126. Thus, the plywood and rubber sheeting constitute an inflatable gripper with the sheet lying substantially against the plywood when pressure is not supplied. When air under pressure is supplied to the gripper the opposite sides of the rubber sheet 129 move laterally into gripping engagement with bricks located between the gripper assembly. A pair of manifolds 133 are mounted on the support plate 121 and are connected to each of the grippers through a bore 134 in the plate 121. Each plywood sheet 126 is provided with a notch 138 which communicates between the adjacent bore and the interior of the rubber sheets 129. The manifold 133 is connected to a suitable source of air pressure through pressure line 137 and a control valve (not shown) which operates to selectively pressurize or exhaust the gripper assemblies. When the gripper assemblies 124 are pressurized the rubber sheets 129 lightly but firmly grip each of the adjacent bricks, as illustrated in phantom in FIG. 12, so that they are not damaged by rigid gripping means or the like, but are firmly held for transfer from the separator table 27 to the kiln car 31. The rubber sheets 129 are stretched over the plywood sheets 126 so that they automatically return to the release position illustrated when pressure is exhausted from the manifold 133.

Figure 6:
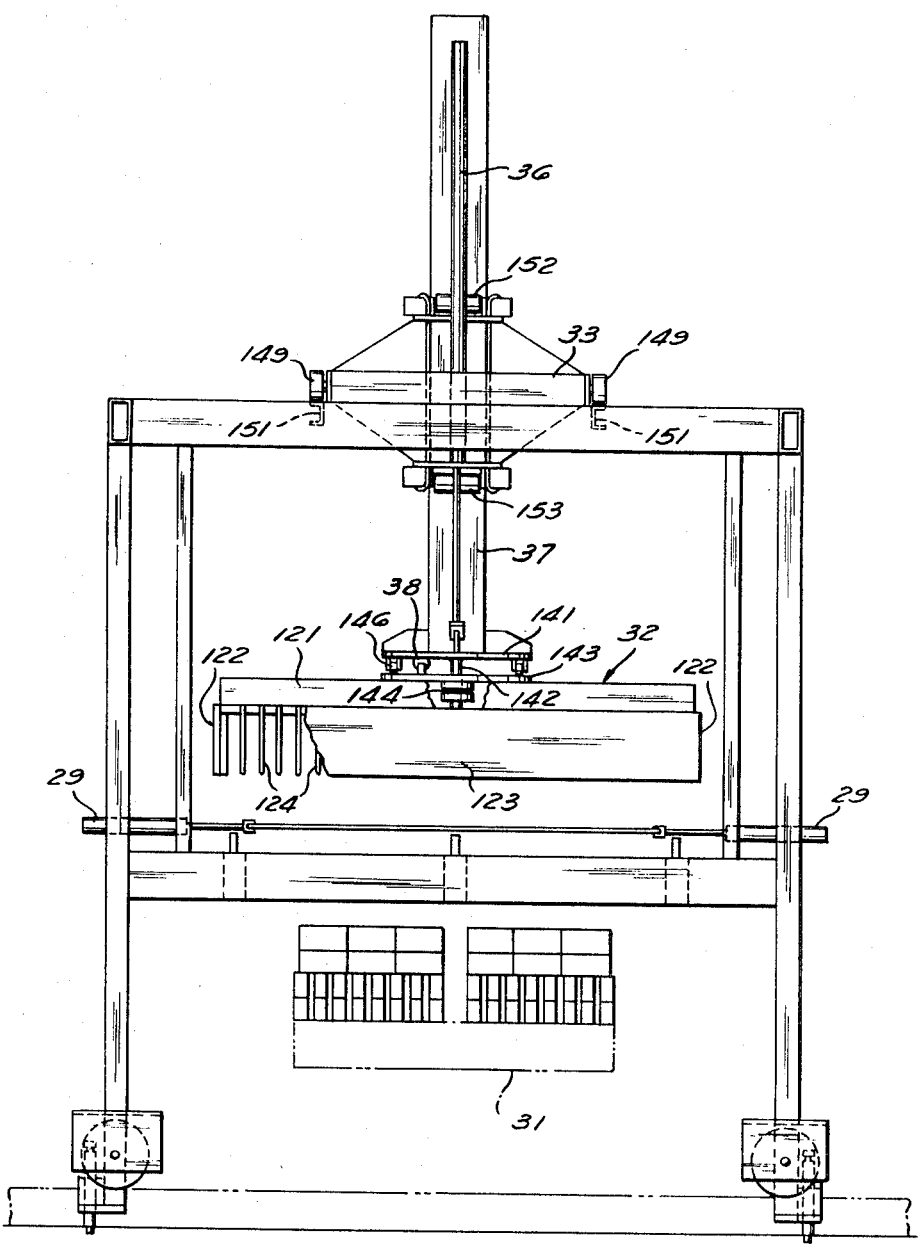
FIG. 6 is an end view of the car loading station illustrating the structure of the gripper transfer support.

Referring to FIGS. 4, 5, and 6, the gripper transfer 32 is supported on the column 37 for rotation about the vertical axis so that the gripper transfer 32 can be indexed through 90°. A circular plate 141 is mounted on the lower end of the column 37 and is provided with an extension shaft 142 projecting below its lower surface through a bearing plate 143 mounted on the support plate 121. The bearing plate 143 is urged toward the plate 141 by a thrust bearing 144 and in cooperation with rollers 146 around the periphery of the plate 141 provides a pivot connection between the two plates 141 and 143. With this structure nonsymmetrical loads can be supported without tipping or canting of the gripper transfer 32. An actuator 38 (illustrated in FIGS. 4 and 5) is mounted on the plate 141 with its piston 148 pivotally connected to the bearing plate 143. The various elements are proportioned so that retraction of the piston 148 moves the gripper transfer to a first position wherein the gripper assemblies 124 are aligned with the spaces between the separator bars 28 and extension of the piston 148 rotates the gripper transfer from this position through an angle equal to 90°.

The carriage 33 is supported on rollers 149 which move along guide tracks 151 when the actuator 34 is operated. The column 37 is preferably square and is supported for vertical movement between spaced roller bearings 152 and 153, each of which is provided with rollers engaging the four sides of the column. These roller bearings are supported by the carriage 33 so the column is vertically movable with respect to the carriage but is vertically guided and is locked against rotation.

One method of operating the machine incorporating this invention is as follows. A column 11 is extruded from the die 10 until the length of the column extending past the cutter 9 is equal to slightly more than the length required for 16 bricks. The excessive length over that required to form 16 bricks is to insure that all of the bricks will be properly formed and results in a small amount of end scrap. The rate of movement of the belt 12 is faster than the rate of extrusion so that when the cutter 9 cuts a slug 13 from the column 11 it moves away from the column which is continuously extruded from the die to provide spacing between slugs 13 carried along the off-bearing belt 12.

When the first slug 13 reaches the inverter station 14 its end engages the gate 18 which prevents further movement of the slug along with the belt. The actuator 21 is then operated to push the slug laterally off of the belt onto the inverter plate 16. Vacuum is then applied to the openings 58 so that this slug is gripped on the inverter plate 16. The timing of the machine is such that the pusher 17 retracts to its initial position before the next or subsequent slug 13 reaches the inverter station. Here again, the slug 13 has a length slightly longer than the length required to form 16 bricks and is carried along the belt until it engages the gate 18. During the movement of the second slug into the inverter station the inverter plate 16 is rotated by the motor 56 to a position over the belt (as illustrated in FIG. 1). When the subsequent slug is properly positioned by its engagement with the gate 18 the vacuum is released from the openings 58 and the first slug is deposited on the second slug to form the two high arrangement.

As soon as this operation is completed, the gate 18 is retracted and the two slugs are carried by the belt 12 to the cutter station where they engage one of the retractable stops 59. In this instance the stop 59 located nine spaces from the center of the pusher 23 is extended so that the two slugs are symmetrically positioned in front of the pusher. The actuator 63 is then operated to move the pusher 23 off of the belt and push the two slugs 13 through the cutter frame 24 wherein the wires 26 operate to cut the slugs into rows of bricks. On the first operation the actuator 63 is operated only far enough to push the slugs part way through the frame but well clear of the belt 12. While this is occurring two additional slugs of the same length are formed and positioned with one on top of the other by the inverter. The pusher 23 is retracted before the subsequent two slugs are carried into the cutting station.

Again the pusher pushes the next pair of slugs partially through the cutter frame 24 completing the cutting of the first pair and partially cutting the second pair of slugs. This cycle is repeated four times.

During the fourth cycle the pusher 23 is operated to push the slugs entirely through the frame so that there are four double rows of bricks in an abutting relationship with the last row just clear of the cutter frame. By this time the puller is moved to position the puller plate 111 adjacent to the wires 26 with the actuator 109 retracted so that the puller plate is above and clear of the bricks. The actuator 109 is then extended to lower the puller plate 111 behind the four double rows of bricks and the motor 119 is energized to pull the four double rows of bricks along the spreader bars until they are properly positioned substantially adjacent to the end of the spreader table 27 remote from the cutters. During this operation the scrap gate 175 is lowered and scrap drops onto the conveyor 178.

The various assemblies are programmed so that four more double rows of bricks are formed in a manner similar to the manner mentioned above and the puller again operates to position the puller plate behind the last of the double rows. The puller plate motor 119, however, is operated this time to move the four double rows of bricks only to the end of the spreader table substantially adjacent to the cutter frame 24. The two groups of brick are spaced from each other (as illustrated in FIG. 5). Since each double row is 16 bricks long and two high each row contains 32 bricks since there are eight double rows there are 256 bricks located on the spreader table. The spreader table actuators 29 are then operated to move the spreader bars 28 apart to produce a spacing between adjacent pairs of bricks in each row. By this time the gripper transfer 32 is moved to a position immediately above the spreader table with the gripper assemblies 124 exhausted or collapsed and in alignment with the spaces between the rows of bricks. The actuators 36 are then operated to lower the gripper transfer 32 over the bricks and pressure supplied to the gripper assemblies 124 causes each of the bricks to be gripped on opposite sides by the rubber sheets 129 of the gripper assemblies 124.

As soon as the bricks are gripped the actuators 36 are retracted, raising the gripper transfer 32 along with the gripped bricks. The actuator 34 is then extended to move the gripper transfer to a position over the kiln car 31. The actuators 36 are then extended and the bricks are lowered onto the kiln car 31 at which time the gripper assemblies are exhausted and the bricks are released gently onto the kiln car.

While this is occurring, the cutter 9 continues to cut slugs 13 from the column 11. However, the next twelve slugs are cut with the length to provide 20 bricks from each column. During this phase of operation the gate 59a is extended and the gate 59b is retracted to symmetrically position the slugs. After the first three double rows of the 20 brick slugs 13 are cut, the puller plate 111 is again operated to pull the cut bricks onto the spreader table. During this phase of operation, the scrap gates 175 are raised to accommodate the longer rows. However, in this instance there are only three double rows rather than four as in the first group. A similar second group of three double rows is formed and placed on the spreader table in the proper position after which the spreader table is opened and the gripper transfer 32 lowered to pickup the two groups of brick. In this instance there are six double rows 20 bricks long and two bricks high, so there are 240 bricks on the spreader table.

The gripper transfer is lowered onto the bricks and grips the bricks after which it is raised and moved back to a position over the kiln car 31. However, during the movement of the gripper transfer to the position over the kiln car it is rotated 90° by the actuator 38 so that the bricks are perpendicular to the previous group of bricks positioned on the kiln car. Again, the actuators 36 are extended until the sensing device engages the bricks previously positioned on the kiln car and stops downward movement of the gripper transfer. This also causes the gripper assemblies to be exhausted releasing the bricks of the second group wherein they rest on the first group but are perpendicular thereto.

The first cycle is again repeated to produce eight more double rows of brick each containing 16 bricks and these are positioned on the second group in a manner described above. The cycling is continued until the desired height of stacks are formed on the kiln car after which the kiln car is moved out of the machine and through the firing kiln. The cycle is then repeated to load the subsequent kiln car which has by that time been moved into a position for loading. The process is substantially continuous so the machine has a high production rate.

FIGS. 14 through 18 illustrate another embodiment of an inverter stacker in accordance with this invention. Referring to FIG. 14, the clay mix is again extruded from a die 201 as a column 202 with the proper cross section to form the bricks. The column 202 extruded from the die extends through a wheel cutter 203, of known design, which cuts the column into groups or slugs 204 consisting of a plurality of bricks 206, a forward batt 207, and a rearward batt 208. The cutter forms the bricks 206 with the proper height for the finished brick by a suitable arrangement of the spacing of the wires on the cutter. The forward batt 207 is wider than the bricks and is uniform in width. However, the width of the batt 208 can vary depending upon the operation of the extruder and cutter. The two batts ultimately become scrap while the bricks 206 are stacked for firing.

When the cut slug of bricks 204 reaches the position A, a pusher mechanism 209, described in detail below, causes a pair of drive lugs 211 to be raised up through longitudinal slots 212 in the support table, so that they embed themselves in the rearwardmost batt 208. The pusher mechanism 209 then operates to move the cut slug 204 from the position A to a position B for stacking and in some instances, inverting.

An inverter stacker assembly 213 is mounted at the location B. It includes a pair of laterally projecting arms 214 pivoted at 215 on the frame for movement from a gripping position illustrated in FIG. 14, in a clockwise direction. A pair of actuators 216 are connected between the arms 214 and the frame to provide this pivotal movement. The pivot axis 215 of the arms is horizontally aligned with the upper surface of the slug of bricks resting on the table so lateral shifting will not occur. Mounted at the outer end of the arms 214 over the support table 217, is a gripper frame 218. The gripper frame is generally rectangular in shape and is proportioned to fit around a slug of bricks 204 at the position B. Mounted on the frame 218 along the opposite sides thereof, are a pair of inflatable grippers 219, best illustrated in FIG. 16. These grippers are arranged to engage the ends of each of the bricks 206 and the batts 207 and 208 so that raising of the frame from the table 217 causes the gripped slug 204 to be raised.

The frame 218 is pivoted about its longitudinal center line for rotation through an angle of substantially 180° so that the cut slug of bricks 204 gripped by the grippers of the frame can be turned over and inverted while they are supported by the frame. The power for turning the frame for this inversion is supplied by a rotary actuator 221.

The operation of stacking with or without inversion is performed substantially as follows. A first cut slug 204 is pushed by the pusher mechanism 209 from the position A to the position B. When it reaches the position B, the forwardmost batt 207 is engaged by a retractable stop 222 to insure the exact proper positioning of the slug within the frame. While the cut slug is moved to the position B, the frame is elevated clear of the table 217. When the first slug 204 is properly positioned, the frame 218 is lowered by the actuators 216 to a position around the slug of bricks 204. The grippers 219 are then inflated to grip the slug of bricks. The actuators 216 are then extended to raise the frame and the slug of bricks 204, gripped by the grippers 219 up off of the table 217 so that a subsequent slug of bricks 204 can be moved by the pusher mechanism 209 into the position B against the stop 222.

If the slug of bricks to be stacked on the subsequent slug of bricks 204A is to be inverted, the actuators 216 are operated to raise the frame as illustrated in FIG. 16 to the upper position so that sufficient clearance is provided to permit the frame to be turned over. The actuator 221 is then operated to turn the frame and invert the bricks supported therein. The actuators 216 are then retracted to allow the frame to position the supported brick of the slug 204 on the group 204A.

If simple stacking is required rather than stacking and inverting, it is not necessary to raise the frame to the height required for inversion. In such an instance, the frame is merely raised so that the supported slug of bricks is clear of the subsequent slug of bricks as illustrated in FIG. 16 at the midposition to allow the subsequent slug of bricks 204A to move in under the supported bricks. The actuators 216 are then retracted to position the supported slug of bricks directly on the subsequent slug of bricks. Because the batts 207 of each slug of bricks are the same size as the batts 207 of the other slugs of bricks, and because these batts are positioned against the stop 222, exact vertical alignment is obtained between corresponding bricks in each slug. After the stacking operation is completed, the grippers 219 are deflated to release the supported brick and the frame is raised to allow movement of the stacked slugs of brick from the inverter position onto a conveyor 223, which carries the stacked brick to the subsequent operations. For example, the conveyor 223 may be used to carry the brick to a location where it is pushed off of the conveyor onto a spreader table and is subsequently transferred to a kiln car by a transfer similar to the transfer illustrated in the first embodiment of this invention. It should be understood, however, that other processing mechanisms may be utilized if desired.

A puller mechanism 224, described in detail below, is used to move the stacked slugs of bricks out of the stacking and inverting position onto the conveyor belt 223.

FIG. 17 schematically illustrates the structure of the puller mechanism 209. This mechanism includes a track assembly 226 supported by longitudinally spaced actuators 227 which are operable to raise and lower the track assembly 226. A chain drive 228 extends below the table 217 and is pivotally connected to a puller member 229. Rearwardly of the pivotal connection of the puller member 229 with the chain 228, the puller member is provided with opposed rollers 231 which project into the associated U-shaped track elements 232 provided by the track assembly 226. A suitable drive motor (not illustrated) is connected to reciprocate the chain 228 so that the puller member 229 is moved back and forth along the track member. In operation the chain moves the puller member 229 back to a starting position substantially as illustrated in FIGS. 14 and 17, while the actuators 227 are retracted to lower the projections 211 on the puller member 229 below the level of the table.

A suitable sensor is provided to determine when the forward end of the slug moving along the table is in proper position, as illustrated in FIG. 14. When such sensing occurs the actuators 227 are extended to raise the track assembly 226 and cause the projections 211 to embed themselves into the lower surface of the rearward batt 208. The actuator powering the chain 228 is then operated to move the puller member down along the table to position the slug of bricks at the position B against the stop 222. The drive for the chain 228 is faster than the rate of extrusion of the column from the die 201 so a space is provided between the pushed slug and the subsequent group moving out of the cutter.

After the group is positioned at position B against the stop 222, the actuators 227 are operated to lower the track assembly causing the projections 211 to retract out of the batt and the drive for the chain is reversed, causing the puller member 229 to be repositioned for subsequent operation. With this mechanism, variations in the size of the rearward batt 208 do not effect precision of positioning the slug of bricks in the inverter, and separation of the one slug from the subsequent slug is obtained.

The inverter stacker then operates to grip the slug of bricks as discussed above and stacks the slug on a subsequent slug with or without inversion.

A structure of the puller mechanism 224 is best illustrated in FIG. 18. This mechanism includes a support beam 236 beside the inverter table 217. A roller carriage 237 is provided with rollers 238 engaging the beam and guiding the carriage for movement lengthwise of the beam. A chain drive 239 is connected to a projection 241 on the carriage 237 to power the carriage in its movement back and forth along the beam 236. A suitable motor (not illustrated) is provided to power the chain 239.

Mounted on the carriage 237 in a lateral opening 242 is a pusher element 243. The pusher element is movable laterally with respect to the row of bricks from a retracted position clear of the slug of bricks to an extended position in which it projects behind a slug of bricks resting on the table 217. A first actuator 244 is mounted at one end of the beam to retract the pusher member 243 and a second actuator 246 is mounted at the other end of the beam to extend the pusher member 243. The end of the pusher member 243 is provided with a lateral bent section 247 proportioned to overlap a flanged section 248 of a retractor element 249 carried by the actuator 244, when the actuator 244 is retracted. A similar extending member 251 provided with a lateral projection 252 is mounted on the actuator 246.

In operation, the chain drive positions the carriage so that the pusher element 243 is located behind the rearward end of the slug of bricks at the position B. At this time the bent portion 247 of the pusher member is aligned with the flanged section 251. The actuator 246 is then retracted to extend the pusher member 243 across the table behind the slug of bricks at the position B. The chain drive is then operated to move the carriage along the table to the position illustrated in FIG. 14 thereby moving the stacked slugs of bricks 204 out of the inverter onto the conveyor 223. When the carriage reaches its other extreme position, the flange 248 extends behind the bent portion 247. Extension of the actuator 244 to move the element 249 to the phantom position retracts the pusher member to its phantom position. The pusher member is then clear of the bricks on the table and can be returned to its initial position and extended behind a subsequent stack of bricks.

When an inverter stacker of the type illustrated in the second embodiment is used to stack uncut slugs of the type disclosed and described in connection with the first embodiment, it is not necessary to use a puller mechanism 209 since the slugs can be separated by an off-bearing belt operating at a speed faster than the speed of extrusion. Similarly, it is not necessary to use the puller mechanism 224 in such an installation.

It should be understood that suitable limit switches and other types of sensing devices are located in appropriate positions to control the operations of the various subassemblies of the machine. Also, suitable counters and the like are provided in the control circuit for the machine to establish the desired program of operation. Since control circuits of this type, sensing devices, and counter devices are well known in the art, they have not been shown in order to simplify the understanding of this machine. Preferably, the piston and cylinder actuators are hydraulically operated since accurate control of hydraulic actuators is easily achieved. However, this invention is not limited to a particular drive power for the actuators. Similarly, the rotary motors may be electric, pneumatic, or hydraulic.

Although preferred embodiments of this invention are illustrated, it is to be understood that various modifications and rearrangements may be resorted to without departing from the scope of the invention disclosed.

What I claim is:

1. A machine for handling slugs of unfired brick material comprising conveyor means operable to sequentially move elongated slugs to a stacking position, gripper means operable to grip substantially the entire length of a first slug delivered to said stacking position by said conveyor means and to position said gripped slug over a subsequent slug at said stacking position, said gripping means being operable to release said gripped slug onto said subsequent slug forming a stack of two slugs in vertical alignment, said gripper means including a gripper assembly and a supporting frame, said gripper assembly being rotatable with respect to said supporting frame to turn a gripped slug through substantially 180° before positioning such slug on said subsequent slug, said conveyor means operating to move said stack of slugs out of said stacking position.

2. A machine as set forth in claim 1 wherein said slug includes a plurality of abutting unfired bricks, and said gripper is operable to individually grip each brick.

3. A machine as set forth in claim 2 wherein said conveyor means is operable to receive abutting slugs and to separate said slugs before delivering them to said stacking position without separating the bricks within said slugs.

4. A machine as set forth in claim 3 wherein said conveyor means includes a pusher operable to drivingly engage the rearward end of a slug and to push said engaged slug away from a subsequent slug to provide spacing therebetween.

5. A machine as set forth in claim 4 wherein said slug is provided with a scrap piece at its rearward end and said pusher drivingly engages said scrap piece.

6. A machine as set forth in claim 5 wherein said pusher includes projections pressed laterally into said scrap piece to provide said driving connection.

7. A machine as set forth in claim 2 wherein said conveyor means includes stack moving means operable to engage the rearward end of a stack and to push said stack out of said stacking position.

8. A machine as set forth in claim 7 wherein said conveyor means includes a powered conveyor and said stack moving means moves said stack onto said powered conveyor.

9. A machine as set forth in claim 8 wherein said gripper means is operable to turn said first slug through substantially 180° before positioning it on said subsequent slug.

10. A machine as set forth in claim 8 wherein said gripper means includes a gripper assembly, and a supporting frame, said gripper assembly being rotatable with respect to said supporting frame to turn a gripped slug through substantially 180° before positioning such slug on said subsequent slug.

11. A machine as set forth in claim 1 wherein said gripper means is operable to turn said first slug through substantially 180° before positioning it on said subsequent slug.

12. A machine as set forth in claim 1 wherein said gripper assembly includes opposed gripping surfaces movable toward and away from each other to grip lateral sides of said slug.

13. A machine as set forth in claim 12 wherein at least one of said gripping surfaces is provided by an inflatable tube.

14. A machine as set forth in claim 13 wherein said supporting frame includes a pair of spaced arms pivoted for movement about an axis substantially aligned with the upper surface of a slug in said stacking position, and said gripper assembly is pivotally mounted on said arms.

15. A machine as set forth in claim 1 wherein said gripper assembly includes vacuum gripping means to grip said slug.

16. A machine as set forth in claim 15 wherein said vacuum gripping means is a plate pivotally mounted for rotation through substantially 180° from a first position aligned with and beside said conveyor means and a second inverted position over said conveyor means, and said gripper means includes transfer means for moving a slug from said conveyor means onto said plate while said plate is in said first position.

17. An inverter for a brick hacker comprising a conveyor operable to transport elongated rectangular cross section slugs to an inverter position, an inverter element pivoted for movement between a first position in horizontal alignment with said conveyor and a second position inverted over said conveyor, a pusher operable to laterally move a first slug from said conveyor to said element while said element is in said first position, gripping means on said element operable to grip said first slug while said element moves to said second position, a slug supported by said element being spaced above said conveyor, a distance at least equal to twice the height of said slugs when said element is in said second position, said gripping means releasing said first slug onto a second slug supported by said conveyor when said inverter element is in said second position.

18. An inverter for a brick hacker comprising a conveyor operable to transport elongated rectangular cross section slugs to an inverter position, an inverter plate pivoted for movement between a first position in horizontal alignment with said conveyor and a second position inverted over said conveyor, a means operable to move a first slug from said conveyor to said plate while said plate is in said first position, vacuum means in said plate operable to grip said first slug while said plate moves to said second position, said plate being spaced above said conveyor a distance at least equal to twice the height of said slugs when in said second position, said vacuum means releasing said first slug onto a second slug supported by said conveyor when said inverter plate is in said second position.

19. An inverter for a brick hacker comprising a conveyor operable to transport elongated rectangular cross section slugs to an inverter position, an inverter plate pivoted for movement between a first position in horizontal alignment with said conveyor and a second position inverted over said conveyor, a retractable gate operable to engage and stop a slug on said conveyor opposite said plate, a pusher operable to laterally move a first slug stopped by said gate from said conveyor to said plate while said plate is in said first position, vacuum means in said plate operable to grip a slug while said plate moves to said second position, said plate being spaced above said conveyor a distance at least equal to twice the height of said slug when in said second position, said vacuum releasing said first slug onto a second slug supported by said conveyor against said gate when said inverter plate is in said second position.

20. A slug inverter and stacker for a brick hacker comprising a conveyor operable to carry elongated rectangular cross section slugs to a stacking position, means to move a first slug to a position adjacent said stacking position, vacuum gripping means operable to grip said first slug adjacent said stacking position and move said first slug to an inverted position over a second slug on said conveyor, said vacuum gripping means thereafter releasing said first slug onto said second slug.

21. A machine as set forth in claim 1 wherein said gripper assembly is selectively operable to position a gripped slug on a subsequent slug without turning said slug through 180°.

P0-1050
(5/69)

UNITED STATES PATENT OFFICE
CERTIFICATE OF CORRECTION

Patent No. 3,589,495                    Dated June 29, 1971

Inventor(s) Florentin J. Pearne, Frank S. Pearne, Frederick G. Robso

It is certified that error appears in the above-identified patent and that said Letters Patent are hereby corrected as shown below:

Column 3, line 24, the number -- 14 -- should appear after "station".

Column 4, line 65, "THe" should read -- The -- .

Same column, same line, -- extension -- should appear after "and" and before "of".

Column 5, line 25, "from" should read -- of -- .

Column 6, line 8, "THere" should read -- There -- .
    Signed and sealed this 11th day of April 1972.

(SEAL)
Attest:

EDWARD M.FLETCHER,JR.                    ROBERT GOTTSCHALK
Attesting Officer                        Commissioner of Patents